United States Patent
Hanly

(10) Patent No.: US 6,873,845 B2
(45) Date of Patent: Mar. 29, 2005

(54) METHOD OF POWER CONTROL AND CELL SITE SELECTION BASED UPON PATH GAIN AND INTERFERENCE LEVEL

(75) Inventor: Stephen Vaughan Hanly, North Melbourne (AU)

(73) Assignee: Lucent Technologies Inc., Murray Hill, NJ (US)

( * ) Notice: Subject to any disclaimer, the term of this patent is extended or adjusted under 35 U.S.C. 154(b) by 139 days.

(21) Appl. No.: 10/141,858

(22) Filed: May 10, 2002

(65) Prior Publication Data

US 2002/0160767 A1 Oct. 31, 2002

Related U.S. Application Data

(63) Continuation of application No. 08/870,669, filed on Jun. 6, 1997, which is a continuation of application No. 08/281,956, filed on Jul. 28, 1994, now Pat. No. 5,697,053.

(51) Int. Cl.$^7$ ................................................ H04Q 7/20
(52) U.S. Cl. .................... 455/436; 455/452.2; 455/522; 455/525
(58) Field of Search ............................... 455/450, 451, 455/452.1, 452.2, 453, 436, 437, 438, 439, 443, 444, 522, 525

(56) References Cited

U.S. PATENT DOCUMENTS

| | | | |
|---|---|---|---|
| 4,613,990 A | 9/1986 | Halpem | |
| 5,056,109 A | 10/1991 | Gilhousen et al. | |
| 5,101,501 A | 3/1992 | Gilhousen et al. | |
| 5,103,459 A | 4/1992 | Gilhousen et al. | |
| 5,109,390 A | 4/1992 | Gilhousen et al. | |
| 5,241,685 A | 8/1993 | Bodin et al. | |
| 5,241,690 A | 8/1993 | Larsson et al. | |
| 5,257,283 A | 10/1993 | Gilhousen et al. | |
| 5,265,119 A | 11/1993 | Gilhousen et al. | |
| 5,267,261 A | 11/1993 | Blakeney, II et al. | |
| 5,267,262 A | 11/1993 | Wheatley, III | |
| 5,287,544 A | 2/1994 | Menich et al. | |
| 5,379,447 A * | 1/1995 | Bonta et al. | 455/437 |
| 5,446,756 A | 8/1995 | Mallinckrodt | |
| 5,490,165 A | 2/1996 | Blakeney, II et al. | |
| 5,513,246 A | 4/1996 | Jonsson et al. | |
| 5,574,982 A | 11/1996 | Almgren et al. | |
| 5,697,053 A | 12/1997 | Hanly | |
| 5,710,974 A * | 1/1998 | Granlund et al. | 455/436 |
| 5,734,967 A * | 3/1998 | Kotzin et al. | 455/436 X |

* cited by examiner

*Primary Examiner*—Nay Maung
*Assistant Examiner*—Philip J. Sobutka

(57) ABSTRACT

A method for use in a cellular communication system is disclosed which dynamically assigns a communication device to a cell site and which dynamically assigns transmit power levels to the communication device. The method is based on measurements of interference levels at cell sites and on the path gain between the communication device and the cell site.

12 Claims, 3 Drawing Sheets

METHOD OF POWER CONTROL AND CELL SITE SELECTION BASED UPON PATH GAIN AND INTERFERENCE LEVEL

This application is a continuation of application Ser. No. 08/870,669, filed Jun. 6, 1997, which is a continuation of application Ser. No. 08/281,956 filed on Jul. 28, 1994, now U.S. Pat. No. 5,697,053

TECHNICAL FIELD

The invention relates to the area of cellular communications.

BACKGROUND OF THE INVENTION

The tremendous growth experienced by wireless communications systems in the past few years has transformed mobile communications from a specialized service for a select few into a service available to everyone. Only a few years ago mobile communications systems used a limited number of narrowband radio channels for transmitting and receiving voice information in a single geographic area whose extent was defined by the range of the mobile transmitter. Today's wireless systems, and in particular present cellular-based systems, are designed to permit an increased number of users to have access to wider bandwidths (to support data communications as well as voice) over a wider geographic area. Despite such advances in wireless technology, there is a constant demand for increased system capacity while maintaining the quality of services to users.

The cellular communications concept calls for dividing a geographic service area into a number of cells. Each cell has an associated cell site (also called a base station) connected to the public telephone network. The cell site establishes a wireless link over radio channels with communication devices (hereinafter "user devices" or "devices") operated by system users within the cell who wish to send and receive information (e.g. text, audio, speech, video) via the public telephone network. Note that users of the system may be mobile or stationary, and the communications of mobile users traveling from a first cell to a second cell can be "handed-off" to the cell site in a second cell without an interruption in communications.

The design of cellular systems and the selection of operating parameters for the system are particularly challenging for several reasons. First, cellular systems have a limited number of radio channels that may be used, and maximizing system capacity through effective utilization of the frequency spectrum is crucial. Second, even with limited spectral resources, a cellular system must be reliable, and typically cellular systems must assure each user of a quality of service level, i.e. a guaranteed minimum bandwidth (in bits per second) and a guaranteed maximum bit error rate. Third, the configuration of users, i.e. the number of users and their locations, is dynamic. For example, a given user may travel from one cell to another during a single communication, or one user with a certain quality of service requirement may terminate a communication in one cell while another user with another quality of service requirement in another cell initiates a communication. Dynamic user configurations thus make it difficult to optimize certain system parameters (e.g. cell site location).

Despite these challenges, the current, first-generation cellular systems, based on analog FM technology, have proved to be very successful. In these systems, interference between the communications of different users in different cells is kept to minimal levels by permitting each cell to use only a subset of the available radio channels. System capacity is maintained through reuse of radio channels in cells that are far enough apart so as to minimally interfere with each other.

With the objective of further reducing interference and increasing capacity, second-generation cellular systems—based on digital radio technology and advanced networking principles—are now being developed and deployed worldwide. Because spread spectrum is a useful technique for facilitating communications when large numbers of users wish to communicate simultaneously, spread spectrum has emerged as a leading multiple access technique for these second generation systems. By "spread spectrum" it is meant that each device generates a wideband signal (e.g. by code division multiple access or by very fast frequency hopping) which is treated as noise by other devices in the system. See, K. S. Gilhousen, et al., "On the Capacity of a Cellular CDMA System," IEEE Trans. Veh. Tech., Vol. 4, No. 2, pp. 303–312, May 1991; A. M. Viterbi and A. J. Viterbi, "Erlang Capacity of a Power Controlled CDMA System," J. Sel. Areas Comm., Vol. 11, No. 6, pp. 892–900, August 1993.

In order to fully exploit the advantages of spread spectrum techniques, however, certain device parameters must be properly selected, e.g. transmit power levels and cell site selection or assignment. A device may have access to a number of possible cell sites and a choice as to which cell site it should communicate with must be made based upon some criterion. Similarly, the transmit power of each device must be determined so as to achieve the desired quality of service. One current technique for selecting parameters is described in Blakeney et al., "Mobile Station Assisted Soft Handoff in a CDMA Cellular Communication System," U.S. Pat. No. 5,267,261 and in Wheatley, "Transmitter Power Control System," U.S. Pat. No. 5,267,267, which describe an open loop scheme for power control and cell site assignment. In this scheme, each cell site transmits a pilot signal. The strength of the pilot signal is measured at a user's device. The user's device is then assigned to the cell site whose pilot signal is strongest The device controls its transmit power level as a function of the received pilot signal strength in such a way as to achieve a desired nominal required received power at the selected cell site. This solution to the power and cell site selection problem, however, has several drawbacks. First, the use of a nominal received power level does not allow different users to have different quality of service requirements. Second, the procedure of establishing the desired nominal received power level at each cell is centralized (in that a system controller determines the value of the nominal received power level at a cell) and leaves open the problem of adapting these levels to changing traffic patterns. Thus, there is a need for an improved method to select device operating parameters in a cellular system, e.g. to select cell sites and to control power levels, to take into account the dynamic nature of the traffic in the cellular system and the increasingly diverse range of services to be carried on wireless networks.

SUMMARY OF THE INVENTION

In accordance with the present invention, one or more operating parameters of a communication device in a cellular communications system are selected based on an interference level measurement at a base station and on the path gain from the communication device to a cell site. In preferred embodiments, the operating parameters include the particular cell site to which the communication device is assigned and the transmit power level for the communication device. The invention advantageously reduces interference levels at cell sites thereby increasing system capacity while maintaining quality of service commitments.

In a first aspect of the invention, a communication device is assigned to one cell site in a plurality of cell sites in the cellular communications system by receiving a measure of the interference level at each cell site, determining the path gain to each cell cite from the device, and assigning the communication device to a particular cell site as a function of the interference level and the path gain. Additionally in preferred embodiments, a communication device with an associated quality of service requirement selects a transmit power level for transmitting to a selected cell site by receiving a measure of the interference level at that cell site, determining the path gain to the cell site, and transmitting with a power level determined as a function of the interference level, required quality of service requirement and the path gain. The cell site assignment and transmit power level selections may be periodically updated.

BRIEF DESCRIPTION OF THE DRAWINGS

Other features and advantages of the invention will become apparent from the following detailed description taken together with the drawings in which.

DETAILED DESCRIPTION

Figure 1:
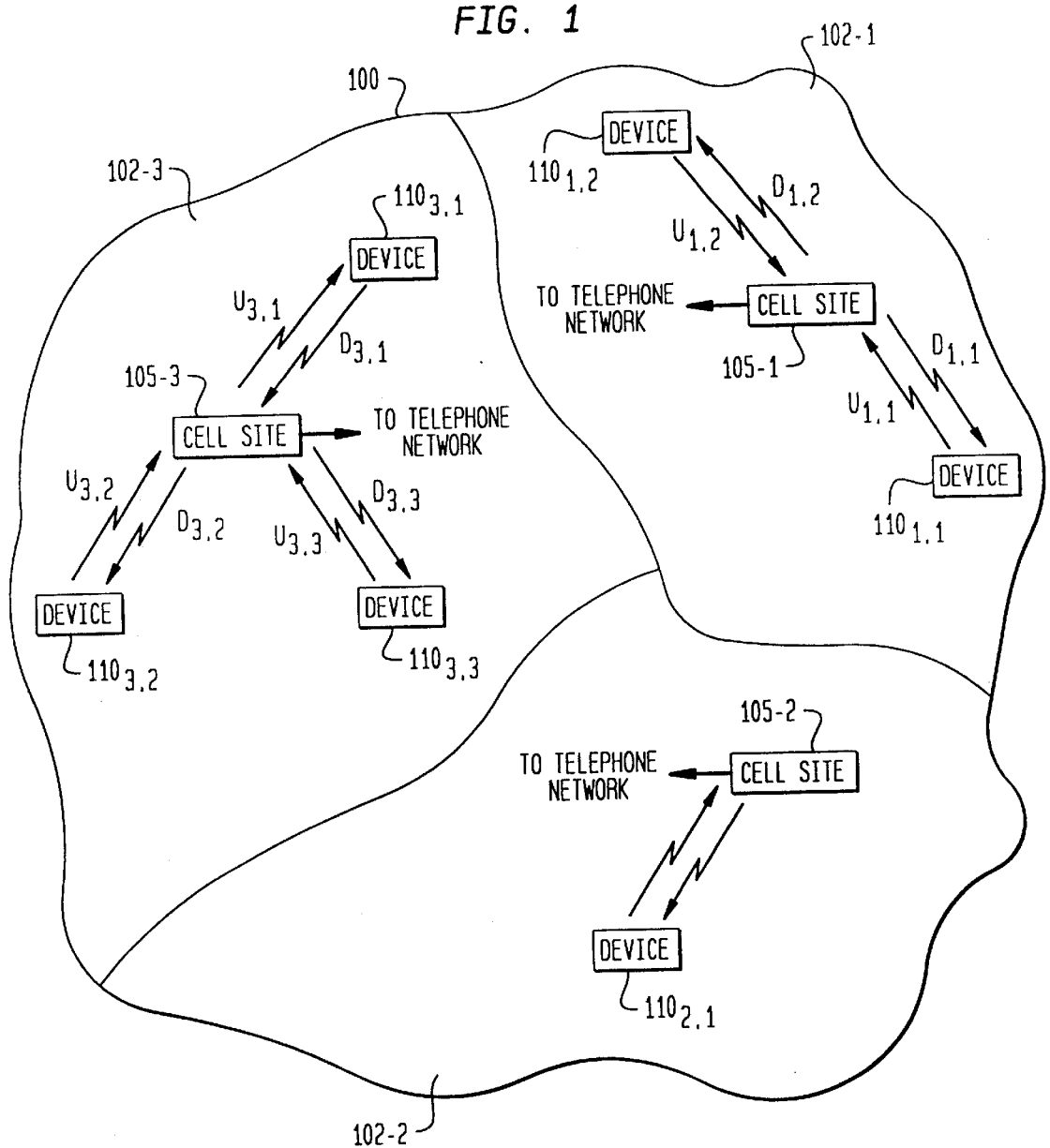
FIG. 1 is a diagram of a cellular communications system in which the inventive method may be practiced.

FIG. 1 illustrates components of a cellular communications system in which the inventive method may be practiced. Cell 102-k, k=1,2, . . . , represents a portion of the geographic area 100 served by the system. Within each cell is cell site 105-k which is connected to the public telephone network. Cell site 105-k establishes a wireless link over a radio channel with communication device $110_{k,j}$, j=1,2, . . . , within cell 102-k for transmitting and receiving information (i.e. data representing text, speech, video, etc.). The wireless link between any device $110_{k,j}$ and cell site 105-k is comprised of an uplink $U_{k,j}$ for transmitting information from device $110_{k,j}$ to cell site 105-k and then to the telephone network and of a downlink $D_{k,j}$ for transmitting to device $110_{k,j}$ information received by cell site 105-k via the telephone network.

The inventive method, described below, selects operating parameters for a system user's communication device in a cellular communications system. In the present illustrative embodiments in particular, the method selects for the device a cell site and a transmit power level for that device. In accordance with the invention, the selection is based on an interference level at the cell site and on the path gain from the device to the cell site. This task is performed for each and every user in the system in a way that maintains a quality of service level for each user. The method is advantageous in that it is dynamic (i.e. able to adapt to changing user configurations and to changing quality of service requirements of system users) and decentralized (i.e. each device can determine its own transmit power level and cell site). The inventive method is easier to implement than a centralized scheme, and the method is more robust with respect to changes in user demands.

If the cellular communications system utilizes spread spectrum access techniques, then several factors make the inventive method especially advantageous in selecting a cell site and in selecting a transmit power level. In particular, in spread spectrum systems the CII ratio, i.e. the ratio of the carrier level to interference level at the cell site, is low because I typically is high (because all other system users are transmitting wideband signals that are treated as interference by a particular device). Thus, the quality of service in these systems for that particular device is very sensitive to changes in I, and the optimal cell site therefore depends on I as well as on the particular device's carrier signal strength C. In contrast, in a narrowband system, I is very low (typically comprising only thermal noise and co-channel interference) and so the optimal cell site will typically be the cell cite for which C is greatest—making the cell site selection problem trivial. In any case, I varies too rapidly in the narrowband system to make adaptive cell site selection and adaptive power control very effective. Thus, the inventive method is particularly advantageous for spread spectrum systems because it focuses on the interference level as measured at the cell site.

Figure 2:
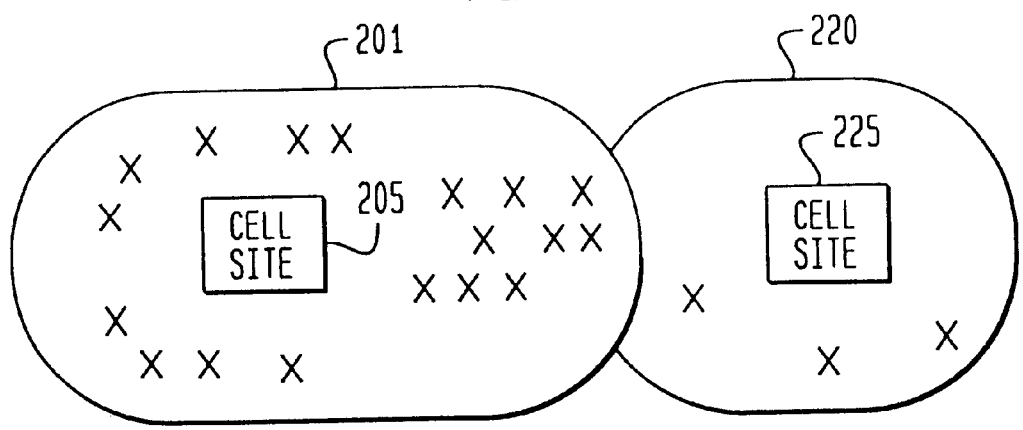
FIG. 2 illustrates a cellular system in which one cell is heavily congested.

In a first aspect, the inventive method selects a cell site for a device. FIG. 2 illustrates a cellular system comprising, illustratively, two cells, 201 and 220, with respective cell sites 205 and 225. Cell 201 is heavily congested and operating near capacity, i.e. a large number of devices (indicated by the x's within the cell) are simultaneously accessing the system. In contrast, there are few devices (also indicated by x's) communicating with cell site 225 in cell 220. In this aspect of the inventive method, presented in detail below, a device selects a cell site from among a set of one or more cell sites based on the interference level at each cell site and on the path gain between the device and each cell site. The interference level at a cell site is defined as the sum of the received power at the cell site from all other transmitting devices (i.e. not including the power from the device in question) plus external noise power (e.g. atmospheric noise) received at the cell site. The path gain is defined as a scale factor that the required received power level at the cell site is divided by in order to determine the required transmit power of the device. As described in detail below, the path gain from the device to the cell site is assumed to be the same as the path gain from the cell site to the device. Advantageously, the path gain from the cell site to the device is easily measured, and the measurement is used for the value of the path gain from the device to the cell site. The path gain is typically less than unity and represents, primarily, the degradation in signal strength due to distance and shadow fading.

Figure 3:
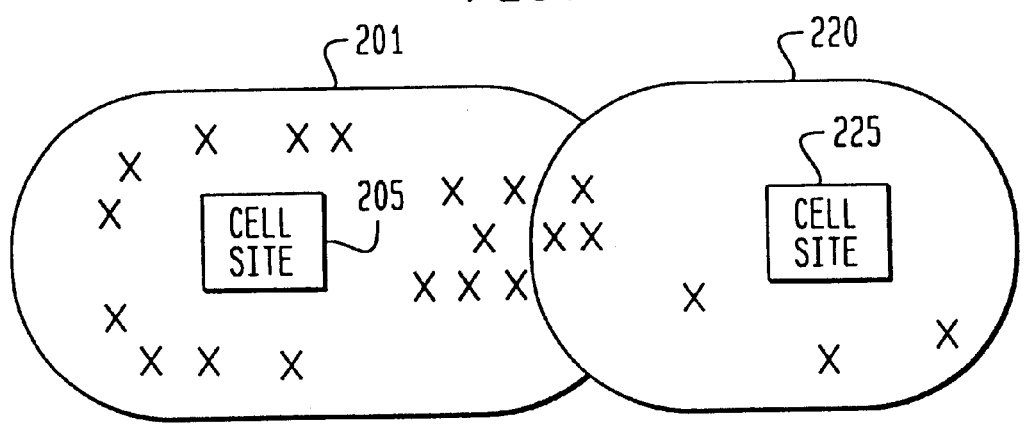
FIG. 3 illustrates a cellular system in which a heavily congested cell is contracted.

Returning to FIG. 2, the inventive method will typically result in some devices in heavily congested cell 201 transmitting instead to the more distant cell site 225 in cell 220, thereby trading a typically smaller path gain (due to the increased distance to the cell site) for reduced interference at the cell site 225 (by reason of few devices transmitting a lower power level in the cell). The method effectively reduces or contracts the area served by heavily congested cell sites, and thus the user configuration of FIG. 2 may, using the inventive method, be transformed into a user configuration akin to the one shown in FIG. 3. Likewise, if and when cell 220 becomes congested relative to a neighboring cell, cell 220 will contract and the neighboring cell will expand—in a sense the method allows the cell to "breathe."

To be more specific, consider a cellular communications system with cell sites k=1,2, . . . , M, at a particular time n. Each user's communication device i,i=1,2, . . . N, is allocated to cell site $S_i$. Note that the signal received at cell site $S_i$ from the $j^{th}$ device constitutes interference at the cell site for the signal received from the $i^{th}$ device. Assume each user has a performance level or quality of service requirement that corresponds to a particular required carrier to interference ratio $(C/I)_i$ at the cell site for the signal received from the $i^{th}$ device. The parameter C is the received signal power of the $i^{th}$ device at cell site $S_i$ and I is the interference, i.e. the sum of received power of all other signals including thermal noise, measured at the cell site. It will be obvious to those skilled in that art that the method below can be readily adapted if the interference level I is defined as the received power of all signals, including the signal from a particular device, received at the cell site. The required ratio of $C/I_i$ is called $\alpha_i$. Thus for each user, it is required that $$\frac{(\text{received power from } i^{th} \text{ device at cell site } S_i)}{\sum_{j \neq i} \text{received power from } j^{th} \text{ device at cell site } S_i + \text{external noise power at } S_i} \geq \alpha_i$$

Figure 4:
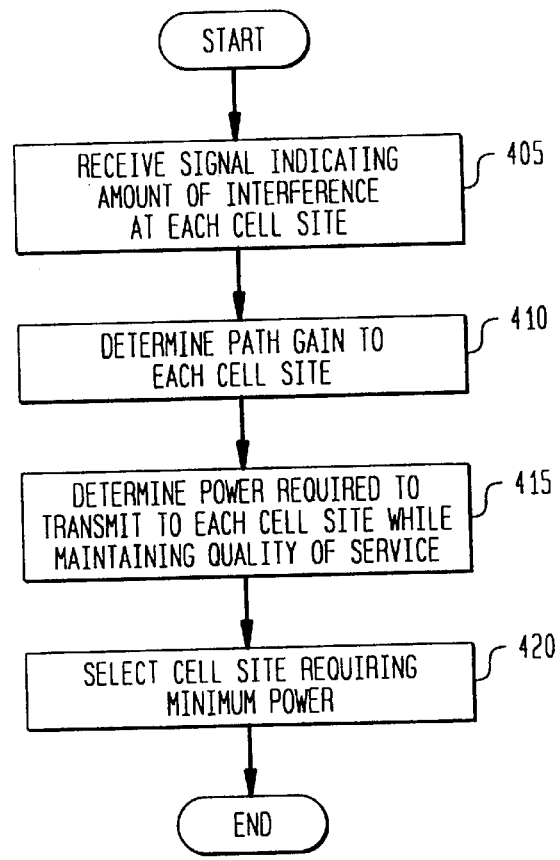
FIG. 4 is a flowchart of the inventive method for assigning a communications device to a cell site as a function of an interference level measurement and a path gain.

Consider a particular $i^{th}$ device which, for illustrative purposes, is assigned to a particular cell site at time n. FIG. 4 illustrates steps for selecting a cell site for the $i^{th}$ device at the next time interval. In step 405 at time n, the $i^{th}$ device receives a signal indicating the amount of interference at each cell site. For example, each cell site k may transmit to the $i^{th}$ device a measure of the interference level at that cell site. In step 410 the $i^{th}$ device determines the path gain $\Gamma_{i,k}$ to each cell site k. One simple method for computing the path gain $\Gamma_{i,k}$ to each cell site is to broadcast a control signal from each cell site (e.g. a pilot signal). Then if all devices know a priori the transmitted power level used by each cell site for the control signal, the path gain to an individual device from a particular cell site (which is advantageously assumed to be the same as the path gain from the individual device to the particular cell site) can readily be determined from the received strength of the control signal from that particular cell site at the device. As a result, the $i^{th}$ device can determine the power required to transmit to each cell site while maintaining the required quality of service in step 415. The power $P_{i,k}$ required to transmit from the $i^{th}$ device to each of the k cell sites, k=1,2, . . . M, is $$P_{i,1} = \alpha_i \frac{I_1}{\Gamma_{i,1}}$$

$$P_{i,2} = \alpha_i \frac{I_2}{\Gamma_{i,2}}$$

$$P_{i,M} = \alpha_i \frac{I_M}{\Gamma_{i,M}}$$

The $i^{th}$ device will then select in step 420, at the next point in time when a new cell site can be chosen, the cell site which requires the least amount of power. The device may then optionally transmit at that power. Of course, $\alpha_i$ is common to equations above since $\alpha_i$ remains the same for a particular device during time n, and thus the choice of cell sites is a function only of the interference level and path gain. In short, selecting the cell site which requires the least amount of power is the same as selecting the cell site with minimum $I_k/\Gamma_{i,k}$ ratio. As discussed below, the quality of service requirement becomes a factor in determining the power level for transmitting to the selected cell site.

The above method can be simplified by considering only a subset of cell sites in the system, instead of all cell sites, when selecting a cell site to assign to a particular user. For example, only those m cell sites having the greatest path gain need be considered. Alternatively, only those cell sites having a path gain exceeding a given threshold can be considered for cell site assignment. The threshold itself can be adaptive to user configurations in the cellular system. Such a restriction in the number of cell sites considered will lead to computational savings and reduced complexity in user equipment. Finally, it may be that selecting a new cell site yields little advantage (e.g. only a minimal reduction in transmit power). To prevent unnecessary changes in cell site assignments and to reduce the rate of change, a damping mechanism can be employed. In this case, the best cell site for the next time interval is considered only as a candidate cell site. Let $$P_{i,candidate} = \alpha_i \frac{I_{candidate}}{\Gamma_{i,candidate}}$$

be the power needed to transmit to the candidate cell site, and let $$P_{i,current} = \alpha_i \frac{I_{current}}{\Gamma_{i,current}}$$

be the power used to transmit to the currently assigned cell site. Then the candidate cell site is chosen as the new cell site only if $P_{i,candidate}$ is sufficiently less than $P_{i,current}$. For example, a threshold $\rho<1$ may be chosen so that a change in cell sites occurs only if $P_{i,candidate} < \rho P_{i,current}$.

Figure 5:
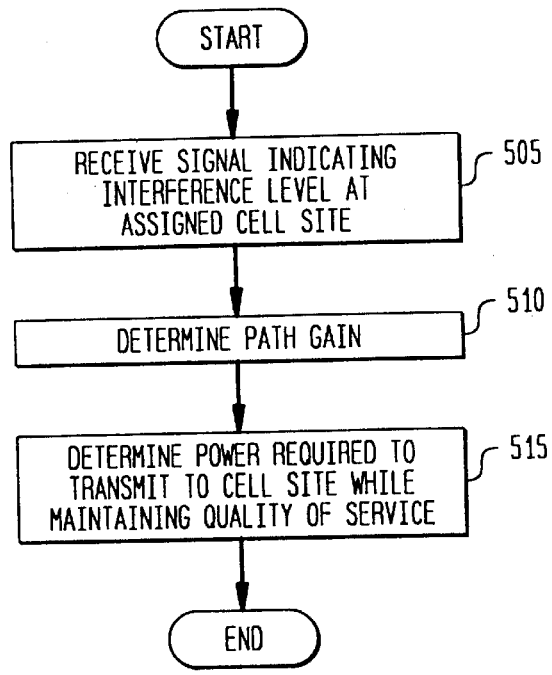
FIG. 5 is a flowchart of the inventive method for selecting a transmit power level for a communications device as a function as a function of an interference level measurement, a quality of service requirement and a path gain.

In a second aspect, the inventive method may also be used to select the transmit power level parameter for a device to communicate to an assigned cell site. Suppose the allocation of cell sites is fixed for a time interval, e.g. the system updates the transmit power levels more frequently than it updates the cell site assignments. FIG. 5 is flowchart of steps in a method for selecting the transmit power for an $i^{th}$ device with quality of service requirement $\alpha_i$ to communicate with an assigned cell site. In step 505 the device first receives a signal indicating the interference level at the assigned cell site. The signal may be broadcast from the assigned cell site, or the signal may be provided by other means. The path gain $\Gamma_i$ is determined next by the device as described in step 410 above. In step 515 the power level for transmitting from the $i^{th}$ device to the assigned cell site is determined according to:

$$P_i = \frac{\alpha_i I}{\Gamma_i}$$

The theoretical basis for the inventive method is that if the C/I constraints of devices in the cellular system can be satisfied, then at any given time there is an optimal assignment of devices to cell sites in the sense that the power levels (and hence the interference) are at the minimum levels that achieve the required levels of performance. Iterations of the above method will find this minimal solution. In practice, users will move, and the method will track the changes in user configuration.

The above disclosure describes a method of selecting operating parameters of a device in a cellular system as a function of the interference level at cell sites in the system and of the path gains between the device and the cell sites. Although the selected operating parameters discussed above include the particular cell site to which the device is assigned and the transmit power level for the communication device, it will be understood by those skilled in that art that other operating parameters may be selected.

The method disclosed herein has been described without reference to specific hardware or software. Instead, the method has been described in such a way that those skilled in the art can readily adapt such hardware or software as may be available or preferable. While the above teaching of the present invention has been in terms of power control and cell site selection in a cellular communications system using spread spectrum access techniques, those skilled in the art will recognize the applicability of these teachings to other specific contexts. For example, the inventive method selects cell sites based only the uplink between users and cell sites. Note that the uplink communication is incoherent in contrast to the coherent downlink—and thus the uplink requires a greater C/I ratio for a given quality of service. Thus, any cell site selection procedure that works for the uplink will necessarily work for the downlink and less transmit power will be required on the downlink. Similarly, the power control equations can be modified for the downlink. Further, it has been assumed that each device employs the full spectrum of available bandwidth. If less than the full spectrum of available bandwidth is used, as for example by using a narrowband channel for communicating, the equations above can easily be modified to reflect that the interference level of interest is only the interference in the narrowband channel.

The invention claimed is:

1. A method of selecting an operating parameter for a device in a cellular communication system, the cellular communication system comprising one or more cell sites, each cell site having an associated interference level, the method comprising the steps of:

determining, at the device, said operating parameter as a function of the interference level at each cell site in the cellular communications system and of the path gain between the device and each cell site, wherein said operating parameter is a selection of a particular one of the cell sites said device is to be assigned for communication, dividing the interference level at each cell site by the path gain between the respective cell site and the device;

determining which cell site corresponds to a minimum value in the dividing step; and selecting a cell site corresponding to said minimum value as said one of said cell sites the device is to be assigned for communication.

2. The method of claim 1, wherein said operating parameter is a transmit power level used by the device when the device communicates with a cell site.

3. The method of claim 1, wherein the interference level associated with a particular cell site is a function of the sum of the received power at the particular cell site from other transmitting devices.

4. The method of claim 1, wherein the device communicates with a cell site by transmitting a signal with a transmit power that is received at the cell cite with a required received power and wherein the path gain is a scale factor based on the transmit power of the device and on the required received power at the cell site.

5. The method of claim 1, wherein the path gain between the device and a particular cell site is determined by a method comprising the steps of:

measuring, at the device, a received signal of known transmitted power from the particular cell site, and determining the path gain as a function of the known transmitted power and the power of the received signal.

6. The method of claim 1, further comprising determining a transmit power level of said device as a function of th product of said minimum value and a desired carrier to interference ratio.

7. An apparatus for selecting an operating parameter for a device in a cellular communication system, the cellular communication system comprising one or more cell sites, each cell site having an associated interference level, the apparatus comprising:

means for transmitting signals from the device to the cells and for receiving signals at the device from said cell sites; and means for determining at the device said operating parameter as a function of the interference level at each cell site in the cellular communications system and of the path gain between the device and each cell site, wherein said operating parameter is a selection of a particular one of the cell sites to which the device is assigned for communication, and wherein said means for selecting selects said particular one of said cell sites by dividing the interference level at each cell site by the path gain between the respective cell site and the device and determines which cell site corresponds to a minimum value of the division, the cell site corresponding to the minimum value being the one of said cell sites the device is to be assigned for communication.

8. The apparatus of claim 7, wherein said operating parameter is a transmit power level used by the device when the device communications with a cell site.

9. The apparatus of claim 7, wherein said interference level associated with each cell site is a function of the sum of the received power at each cell site from other transmitting devices.

10. The apparatus of claim 7, wherein the device communicates with a cell site by transmitting a signal with a transmit power that is received at the cell site with a required received power and wherein the path gain is a scale factor based on the transmit power of the device and on the required received power at the cell site.

11. The apparatus of claim 7, wherein the path gain between the device and a particular cell site is determined by an apparatus comprising:

means for measuring at the device a received signal of known transmitted power from the particular cell site; and means for determining a path gain as a function of the known transmitted power and the power of the received signal.

12. The apparatus of claim 7, further comprising means for calculating a transmit power level of said device as a function of the product of said minimum value and a desired carrier to interference ratio.

* * * * *